United States Patent
Bai et al.

(10) Patent No.: US 10,715,369 B2
(45) Date of Patent: Jul. 14, 2020

(54) PHASE TRACKING REFERENCE SIGNAL

(71) Applicant: QUALCOMM Incorporated, San Diego, CA (US)

(72) Inventors: Tianyang Bai, Bridgewater, NJ (US); Juergen Cezanne, Ocean Township, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/975,112

(22) Filed: May 9, 2018

(65) Prior Publication Data
US 2019/0109749 A1 Apr. 11, 2019

Related U.S. Application Data

(60) Provisional application No. 62/571,138, filed on Oct. 11, 2017, provisional application No. 62/588,110, filed on Nov. 17, 2017.

(51) Int. Cl.
*H04L 27/26* (2006.01)
*H04L 5/00* (2006.01)
(Continued)

(52) U.S. Cl.
CPC ........ *H04L 27/2628* (2013.01); *H04L 1/0086* (2013.01); *H04L 1/1812* (2013.01);
(Continued)

(58) Field of Classification Search
None
See application file for complete search history.

(56) References Cited

U.S. PATENT DOCUMENTS

| | | | | |
|---|---|---|---|---|
| 2004/0223561 | A1* | 11/2004 | Tahat | H04L 1/02 375/347 |
| 2012/0087428 | A1* | 4/2012 | Martinez | H04L 25/022 375/260 |

(Continued)

OTHER PUBLICATIONS

Syrjala, M. Valkama, N. Tchamov, and J.Rinne, "Modelling and Mitigation Techniques in OFDM Communications Systems", in Proc. IEEE WTS 09, pp. 1-7, Apr. 2009. (Year: 2009).*

(Continued)

*Primary Examiner* — Jamaal Henson
(74) *Attorney, Agent, or Firm* — Nerrie M. Zohn

(57) ABSTRACT

At a receiver, errors may occur in estimating phase trajectory based on PT-RS due to a window effect. In order to address the problem of such errors, a transmitter determines at least one location for inserting PT-RS samples into a sequence of a plurality of samples, wherein a first set of the samples comprises a first number of samples at a beginning of the sequence and/or a second number of samples at an end of the sequence, and wherein the at least one location for the PT-RS samples is within a second set of the plurality of samples. The apparatus inserts the PT-RS samples into the sequence based on the determined at least one location and transmits a signal based on the inserted PT-RS samples. A receiver extracts the PT-RS samples and estimates phase errors for data samples in the received transmission based on the extracted PT-RS samples.

71 Claims, 13 Drawing Sheets

(51) Int. Cl.
*H04L 1/18* (2006.01)
*H04L 1/00* (2006.01)
*H04L 25/02* (2006.01)
*H04B 17/309* (2015.01)

(52) U.S. Cl.
CPC .............. *H04L 5/001* (2013.01); *H04L 5/005* (2013.01); *H04L 5/0048* (2013.01); *H04L 25/0224* (2013.01); *H04L 27/266* (2013.01); *H04L 27/2613* (2013.01); *H04L 27/2636* (2013.01); *H04L 27/2644* (2013.01); *H04L 27/2675* (2013.01); *H04B 17/309* (2015.01); *H04L 27/2655* (2013.01)

(56) References Cited

U.S. PATENT DOCUMENTS

| | | | | |
|---|---|---|---|---|
| 2013/0315321 | A1* | 11/2013 | Rajagopal | H04L 27/2607 375/260 |
| 2015/0146640 | A1 | 5/2015 | Baldemair et al. | |
| 2016/0006594 | A1* | 1/2016 | Persson | H04L 5/0044 375/308 |
| 2018/0142796 | A1* | 5/2018 | Holman | F04B 53/06 |
| 2018/0198651 | A1* | 7/2018 | Kundargi | H04L 25/0224 |
| 2018/0227035 | A1* | 8/2018 | Cheng | H04B 7/088 |
| 2018/0367277 | A1* | 12/2018 | Zhang | H04L 5/0048 |

OTHER PUBLICATIONS

Interdigital et al., Remaining Issues on PT-RS, 3GPP Draft, R1-1718825 Remaining Issues on PT-RS Revision Clean, 3rd Generation Partnership Project (3GPP), Mobile Competence Centre, 650, Route Des Lucioles, F-06921 Sophia-Antipolis Cedex, France, vol. Ran WG1, No. Prague, Czech Republic, Oct. 9, 2017-Oct. 13, 2017, Oct. 9, 2017 (Oct. 9, 2017), XP051353307, 9 Pages, Retrieved From the Internet: URL:http://www.3gpp.org/ftp/tsg_ran/WG1_RL1/TSGR1_90b/Docs/ [retrieved on Oct. 9, 2017].

International Search Report and Written Opinion—PCT/US2018/051531—ISA/EPO—Dec. 12, 2018.

Nokia et al., "On Details of the PT-RS Design for DFT-S-OFDM", 3GPP Draft, R1-1714258, 3rd Generation Partnership Project (3GPP), Mobile Competence Centre, 650, Route Des Lucioles, F-06921 Sophia-Antipolis Cedex, France, vol. Ran WG1, No. Prague, Czech Republic, Aug. 21, 2017-Aug. 25, 2017, Aug. 20, 2017 (Aug. 20, 2017), XP051317044, 8 Pages, Retrieved from the Internet: URL:http://www.3gpp.org/ftp/Meetings_3GPP_SYNC/RAN1/Docs/ [retrieved on Aug. 20, 2017].

Samsung: "Discussion on PT-RS", 3GPP Draft, R1-1717631 Discussion on PT-RS, 3rd Generation Partnership Project (3GPP), Mobile Competence Centre, 650, Route Des Lucioles, F-06921, Sophia-Antipolis Cedex, France, vol. Ran WG1, No. Prague, CZ, Oct. 9, 2017-Oct. 13, 2017, Oct. 8, 2017 (Oct. 8, 2017), XP051340817, 9 Pages, Retrieved from the Internet: URL:http://www.3gpp.org/ftp/Meetings_3GPP_SYNC/RAN1/Docs/ [retrieved on Oct. 8, 2017].

* cited by examiner

PHASE TRACKING REFERENCE SIGNAL

CROSS-REFERENCE TO RELATED APPLICATIONS

This application claims the benefit of U.S. Provisional Application Ser. No. 62/588,110, entitled "Phase Tracking Reference Signal" and filed on Nov. 17, 2017, and U.S. Provisional Application Ser. No. 62/571,138, entitled "Phase Tracking Reference Signal" and filed on Oct. 11, 2017, both of which are expressly incorporated by reference herein in their entirety.

BACKGROUND

Technical Field

The present disclosure relates generally to communication systems, and more particularly, to a phase tracking using reference signals.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

PT-RS may be applied in wireless communication (e.g., 5G NR) in order to track and correct phase errors in wireless communication. PT-RS may be used in 5G NR to track and correct phase errors (e.g., in mmWave (mmW) systems). Phase errors may be caused by phase noise, carrier frequency offset, Doppler effect, etc. However, problems may arise when receiving PT-RS in connection with Inverse Discrete Fourier Transform (IDFT).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

PT-RS is a reference signal that may be used in 5G NR to track and correct phase errors in mmW systems, e.g., phase errors caused by phase noise, carrier frequency offset, Doppler effect, etc. However, problems may arise at a receiver when receiving the PT-RS in connection with IDFT. For example, when processing data for transmission in Discrete Fourier Transform spread Orthogonal Frequency-Division Multiplexing (DFT-s-OFDM) communication, if PT-RS samples are inserted before a DFT operation then a window effect may occur at the receiver that attempts to interpolate a phase error trajectory based on the PT-RS. At the receiver, an IDFT process may be applied to the received signal to determine the received symbols. The output sequence of the IDFT process may follow a circulant structure, which causes a first sample and a last sample in a phase error trajectory to converge to a similar value. This forced convergence at the receiver can lead to errors and uncertainty in estimated phase trajectory due to the application of PT-RS at the receiver. The error may occur, e.g., at the beginning of samples and/or at the end samples. This potential error and uncertainty may be referred to as a window effect.

The present application addresses the problem of such errors and uncertainty, e.g., due to a window effect at receiver attempting to receive the PT-RS. The present application provides a solution to the uncertainty through a PT-RS pattern that reduces or minimizes a window effect at the receiver. The transmitter may insert PT-RS into a data transmission at a transmitter in a pattern based on a window effect that may occur at a receiver. For example, the transmitter may insert the PT-RS into the data transmission in locations that are less likely to be affected by a window effect. The PT-RS may be inserted into the data transmission at locations different than the beginning and/or end sample(s). By combining PT-RS with a data transmission in locations that are less affected by the window effect, e.g., at locations different than a beginning and/or end sample(s), may reduce uncertainty for a receiver attempting to receive and extract the PT-RS.

In an aspect of the disclosure, a method, a computer-readable medium, and an apparatus are provided for wireless communication at a transmitter, such as a user equipment. The apparatus determines at least one location for inserting phase tracking reference signal (PT-RS) samples into a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples. The apparatus then the PT-RS samples into the sequence based on the determined at least one location, and transmits a signal based on the inserted PT-RS samples. The first set of the plurality of samples may be identified as being potentially subject to a receiver side edge effect. The signal may comprise a DFT-s-OFDM signal. Therefore, the apparatus may first combine the samples for PT-RS samples and other samples based on the determined location to form a Pre-DFT sequence of samples for a symbol, and perform DFT on the pre-DFT sequence. The first set of samples that are potentially subject to the receiver side window effect may comprise at least one of a first number of samples at a beginning of the pre-DFT sequence in a symbol and a second number of samples at an end of the pre-DFT sequence. The second set of the plurality of samples may comprises samples that are not subject to, or less likely to be subject to, the receiver side window effect. The PT-RS pattern may be determined based on a predefined formula.

In an aspect of the disclosure, a method, a computer-readable medium, and an apparatus are provided for wireless communication at a receiver, such as a base station. The apparatus determines at least one location for a phase tracking reference signal (PT-RS) samples in a received transmission comprising a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples. The apparatus extracts the PT-RS samples from the received transmission based on the determined at least one location and estimates phase errors for data samples in the received transmission based on the extracted PT-RS samples. The signal may comprise a DFT-s-OFDM signal. Therefore, the apparatus may perform IDFT on the received transmission before extracting the PT-RS samples. The apparatus may correct phases of received data samples based on the estimated phase errors. The first set of samples that are potentially subject to the receiver side window effect may comprise at least one of a first number of samples at a beginning of the Pre-DFT sample sequence in a symbol and a second number of samples at an end of Pre-DFT sequence in the symbol. The second set of the plurality of samples comprises samples that are not subject to the receiver side window effect. The PT-RS pattern may be determined based on a predefined formula.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
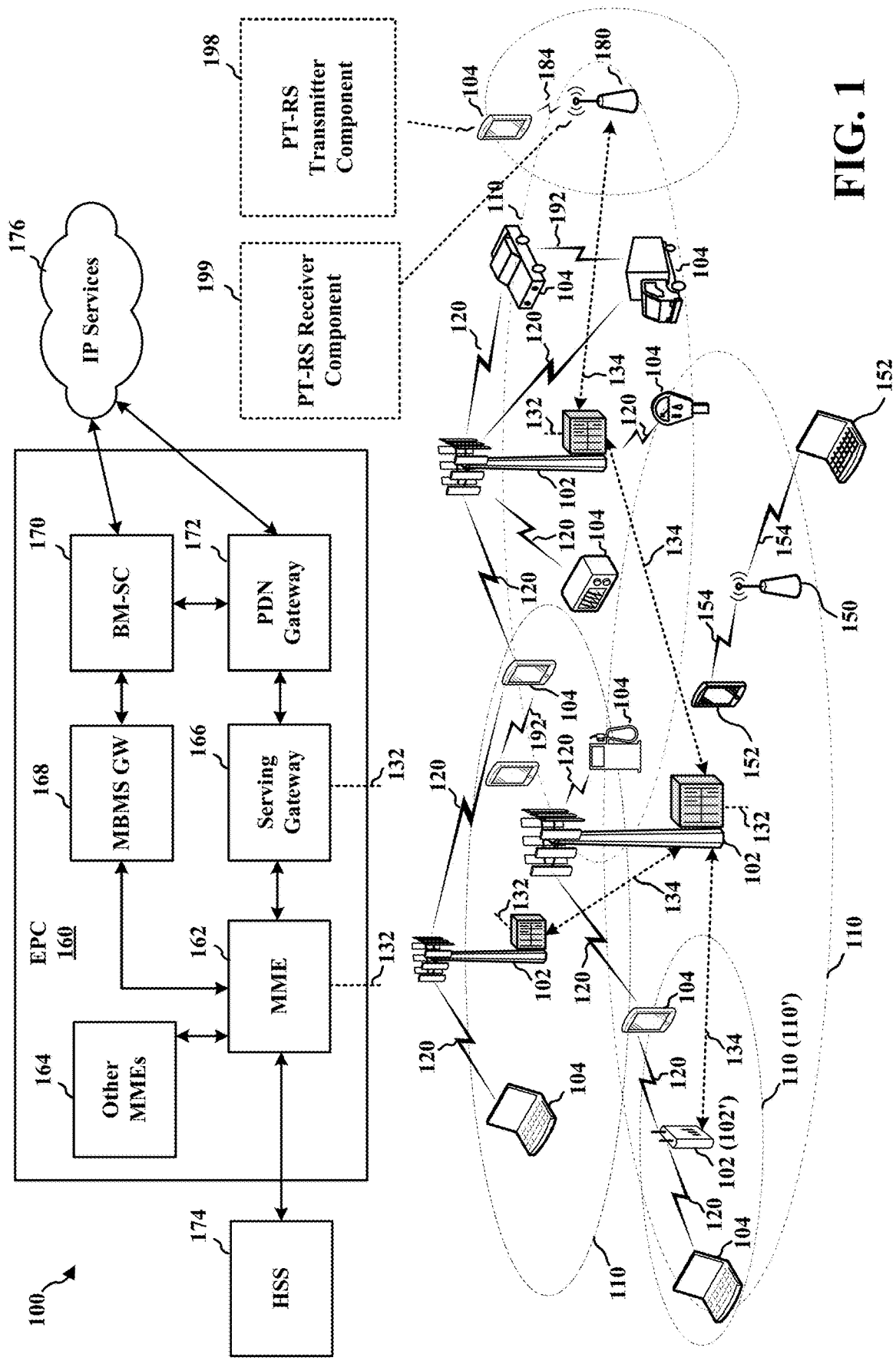
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may be configured with a PT-RS transmitter component 198 configured to insert PT-RS samples in a pre-DFT sequence of a plurality of samples when processing data for transmission, e.g., including any of the aspects described in connection with FIGS. 5-10. In certain aspects, UE 104/base station 180 may be configured to include a PT-RS Receiver Component 199 configured to extract PT-RS samples when processing a received signal data, e.g., including any of the aspects described in connection with FIGS. 5-7 and 11-13.

Figure 2A:
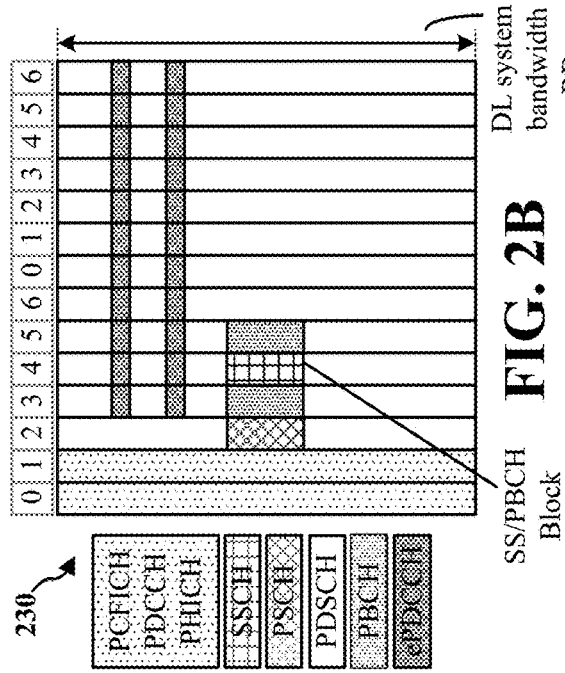
FIGS. 2A, 2B, 2C, and 2D are diagrams illustrating examples of a DL frame structure, DL channels within the DL frame structure, an UL frame structure, and UL channels within the UL frame structure, respectively.
Figure 2B:
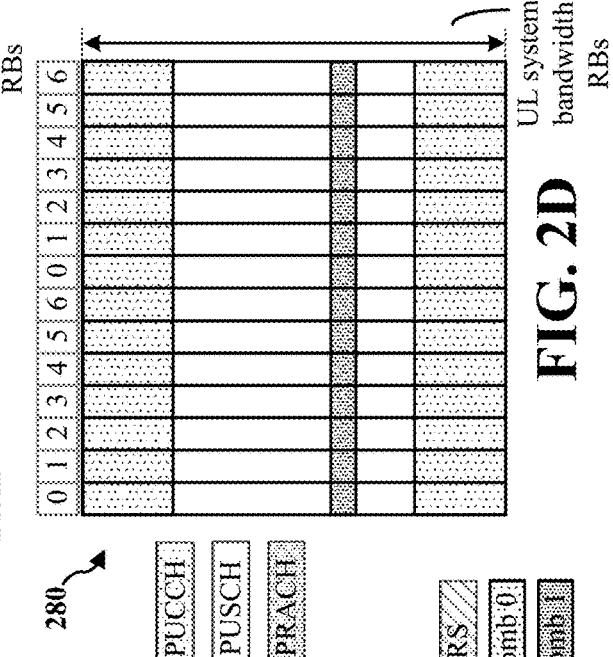
Figure 2C:
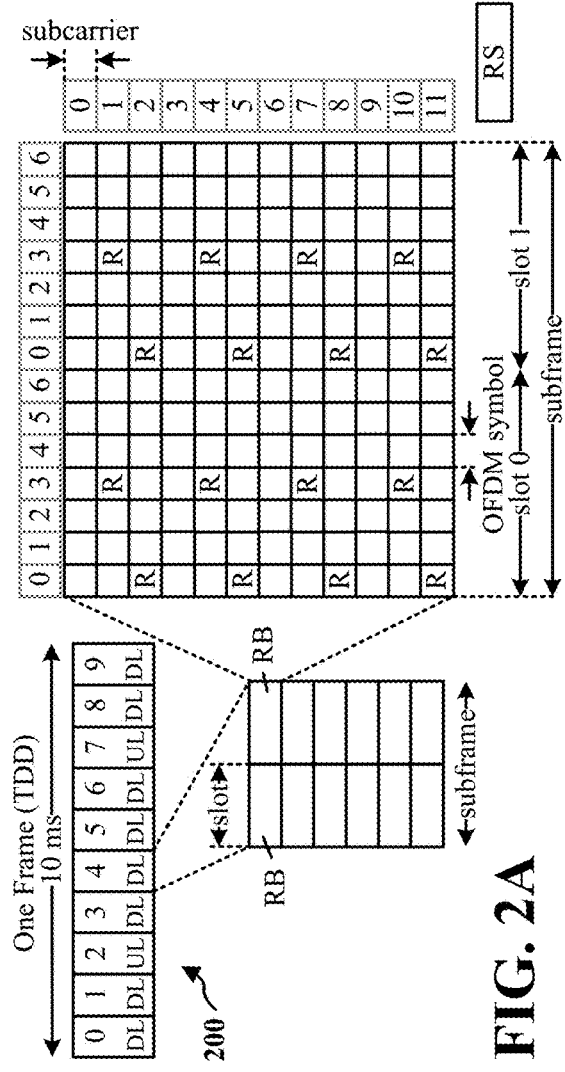
Figure 2D:
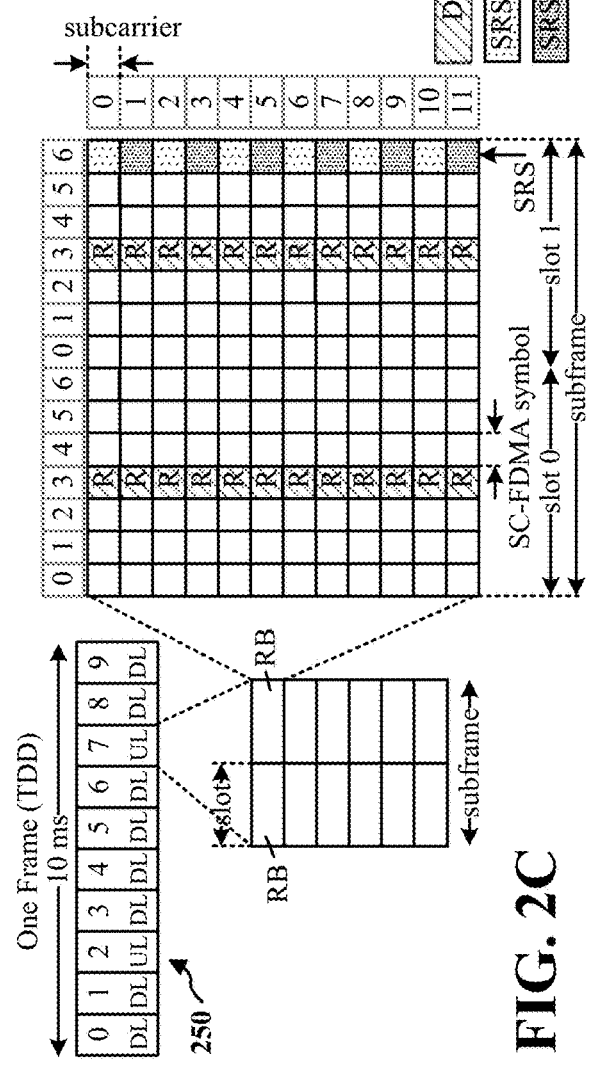

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $V*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
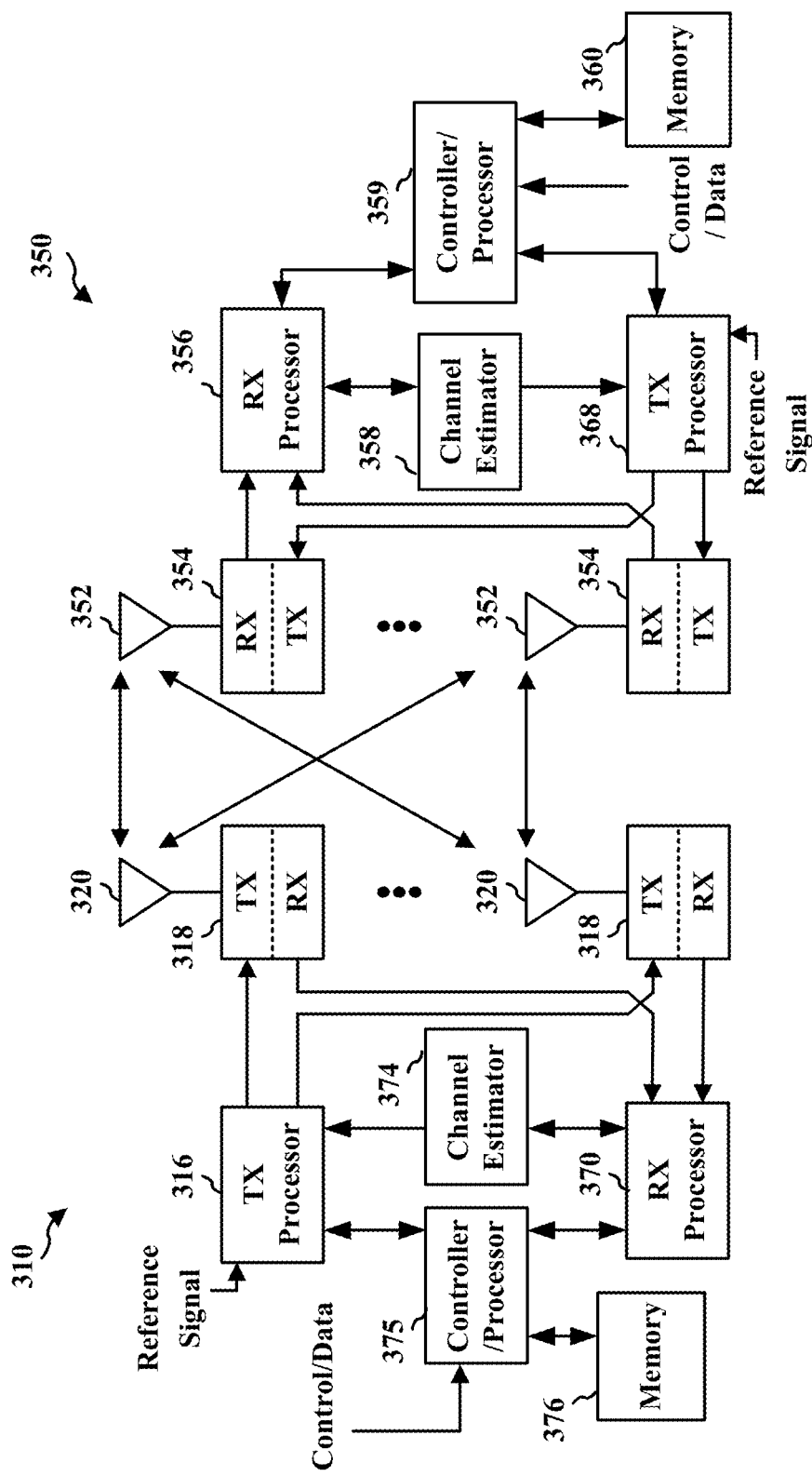
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
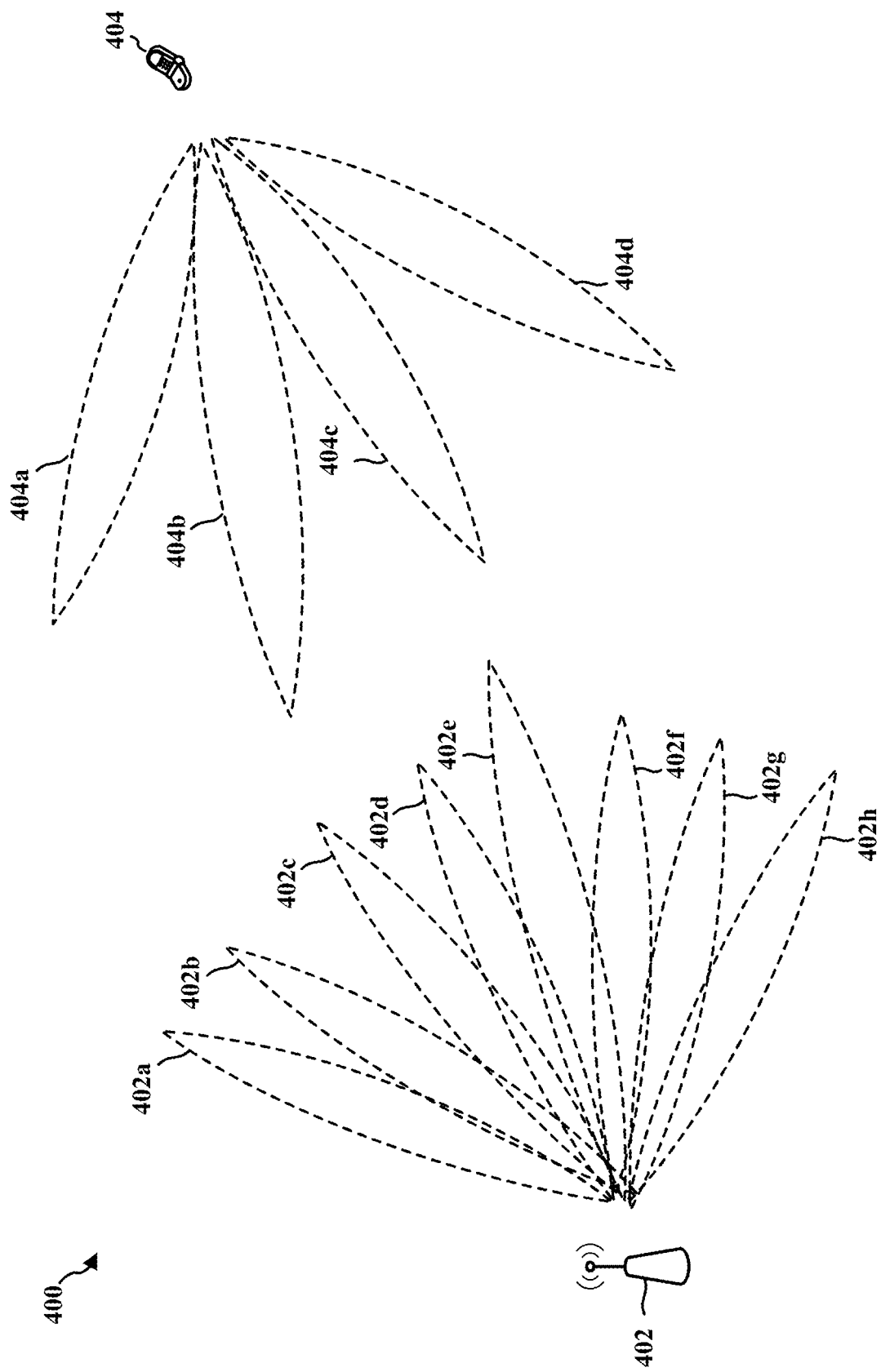
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

One of the reference signals in NR may be PT-RS. PT-RS may be applied in 5G NR to track and correct phase errors. Phase errors may be caused by phase noise, carrier frequency offset, Doppler effect, etc. For example, phase noise may cause random fluctuations in a phase of a transmitted waveform due to jitter of an oscillation in a wireless link. Carrier Frequency Offset (CFO) and/or Doppler may also cause the phase of the transmitted waveform to vary.

This may be especially important in mmW systems, because the impact of phase noise, e.g., phase errors, may be more significant in mmW wireless communication systems than in sub-6 GHz wireless communication systems. The phase noise may increase as a function of oscillator carrier frequency. Therefore, PT-RS may be useful in mmW systems to mitigate phase noise.

PT-RS may have a low density in the frequency domain and high density in the time domain, because the phase rotation due to common phase error (CPE) may be the same for all subcarriers within an OFDM symbol, whereas they may be low correlation of phase noise across OFDM symbols. PT-RS may be UE specific, confined in a scheduled resource, and may be beamformed. PT-RS may be configured based on a quality of oscillators, modulation and coding schemes used for the transmission, carrier frequency, OFDM subcarrier spacing, etc.

Figure 5:
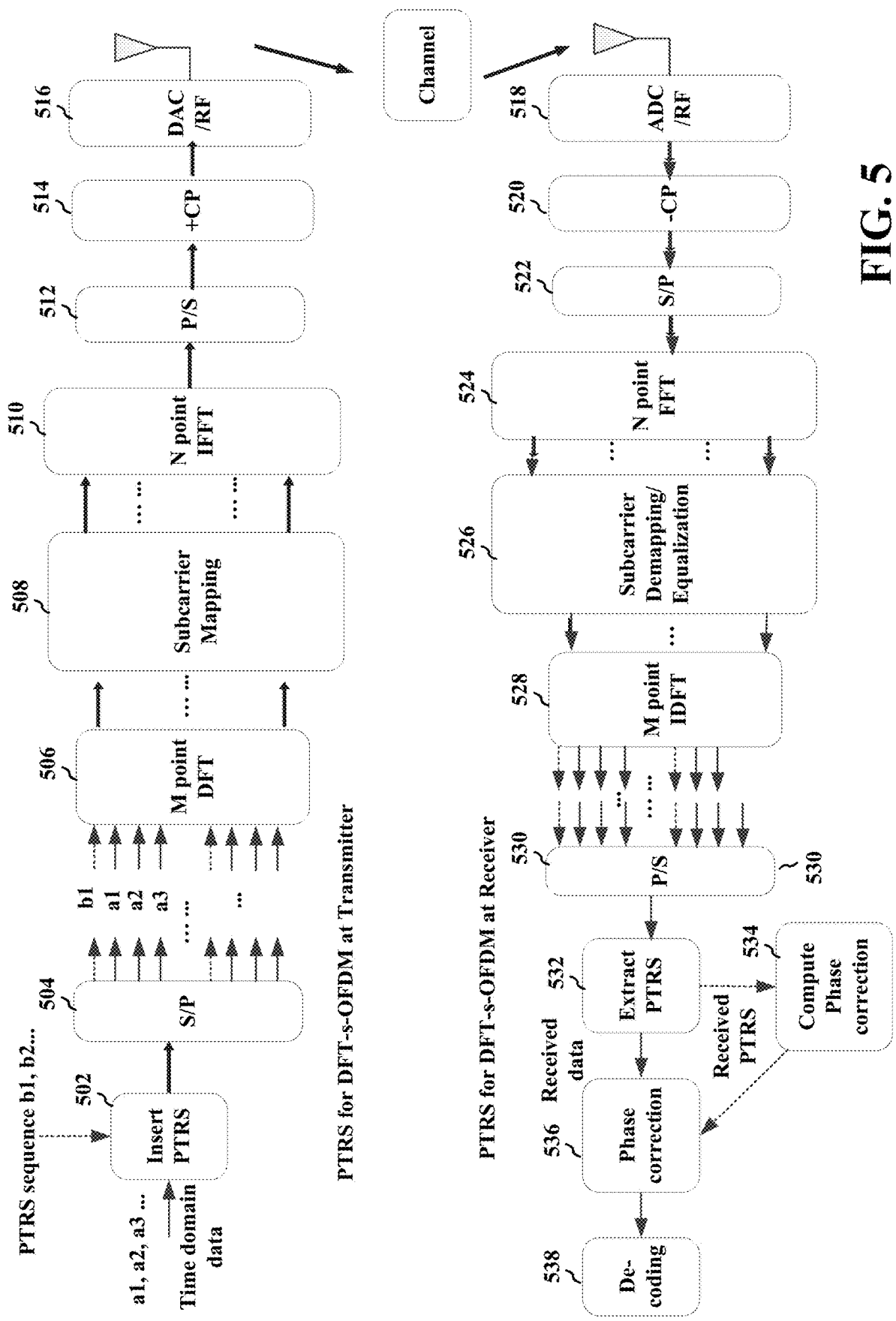
FIG. 5 illustrates an example of PT-RS processing in connection with DFT-s-OFDM.

FIG. 5 illustrates an example diagram for combining PT-RS with data symbols in connection with DFT-s-OFDM. FIG. 5 illustrates PT-RS sequence b1, b2, . . . inserted along with data symbols a1, a2, a3 when processing a data for transmission to a receiver. At 502, the PT-RS sequence b1, b2, . . . is inserted along with the data a1, a2, a3 and is processed by serial-to-parallel conversion 504. An M point DFT process is then applied at 506, where M corresponds to the number of subcarriers assigned in the transmission. A subcarrier mapping is performed at 508, and then an N point Inverse Fast Fourier Transform (IFFT) process 510 is applied. A parallel-to-serial conversion is applied at 512, and a cyclic prefix is added at 514. Then, a digital-to-analog conversion (DAC) or radio frequency (RF) conversion is applied at 516 to generate the signal for transmitting the data and PT-RS to a receiver via a wireless channel.

A receiver receiving the signal on the channel, applies an analog-to-digital conversion (ADC) at 518, removes the cyclic prefix at 520, and performs a serial-to-parallel conversion at 522. At 524, an N point Fast Fourier Transform (FFT) process is applied, and a subcarrier demapping or equalization is applied at 526. After an M point Inverse Discrete Fourier Transform (IDFT) operation at 528, a parallel-to-serial conversion is applied at 530. The PT-RS may then be extracted from the received data at 532. The extracted PT-RS may be used to calculate a phase correction at 534 to compensate for phase noise in the received signal. At 536, the phase correction may be applied to the received data based on the computed phase correction. Then, the received data may be decoded at 538.

Figure 6:
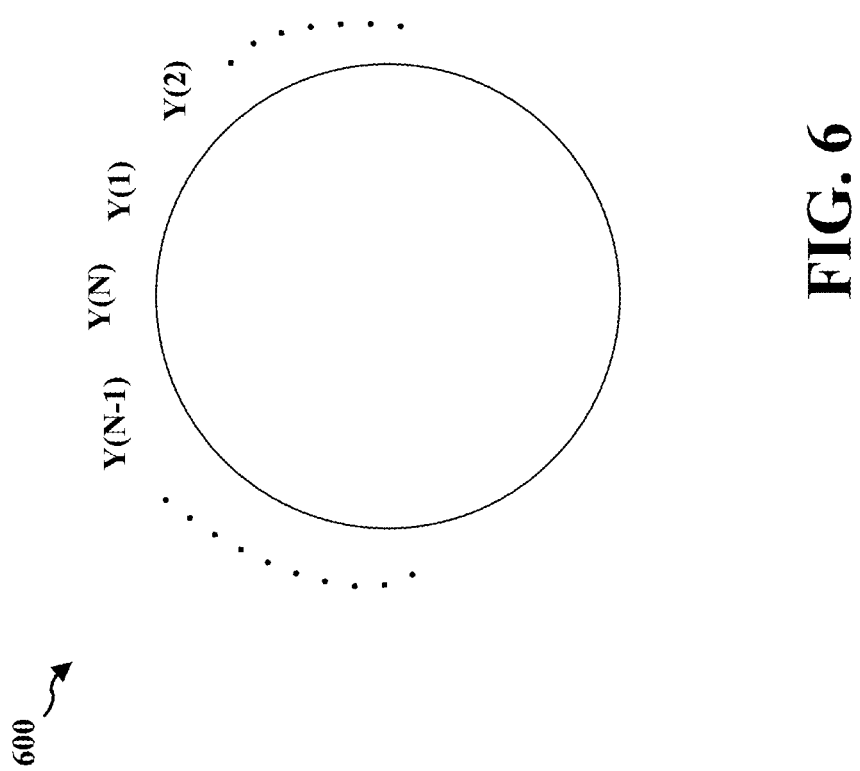
FIG. 6 illustrates an example circulant structure.

However, problems may arise when inserting PT-RS samples along with data symbols prior to DFT processing, e.g., at 506. In DFT-s-OFDM, the pre-DFT insertion of PT-RS samples when processing a transmission at a transmitter may lead to a window effect at a receiver. The receiver may use the phases of the received PT-RS samples in order to estimate a phase trajectory over time. At the receiver, the IDFT process may be applied to the received signal in order to determine the received symbols. The output sequence of the IDFT process may follow a circulant structure, which causes a first sample and a last sample in a phase error trajectory to converge to a similar value. FIG. 6 illustrates an example circulant structure 600 in which samples near the beginning of a trajectory and near the end of a trajectory converge to a similar value. In FIG. 6, Y(1) represents a first sample value in N samples of the pre-DFT sample sequence for a symbol, Y(2) represents a second sample value, Y(N) represents a last sample value for the symbol, and Y(N−1) represents a sample value before the last sample value. The number of samples N corresponds to the number N of the N point IDFT applied at the receiver. As illustrated in FIG. 6, the value of Y(N) converges near the initial value of Y(1) in this circulant structure. This forced convergence at the receiver can lead to errors and uncertainty in the estimated phase trajectory based on the PT-RS. The potential error and uncertainty may be referred to herein as a window effect.

The present application addresses the problem of such error and uncertainty in the reception of PT-RS through a PT-RS pattern that reduces or minimizes a window effect experienced by a receiver attempting to receive the PT-RS.

For example, a PT-RS may be inserted or combined with data at a transmitter in a location that is based on a window effect that may be experienced at a receiver. For example, the transmitter may insert the PT-RS samples into the pre-DFT sample sequence for the data transmission in locations that are less likely to be affected by a window effect. The PT-RS may be inserted into the data transmission at locations different than the beginning and/or end samples in the pre-DFT sample sequence for a symbol. For a pre-DFT sample sequence for a symbol in which the sequence includes N samples extending in a time domain for the symbol from sample 1 to sample N, the beginning sample(s) may include the first sample in the sequence according to a time domain, e.g., sample 1, in the sequence for the symbol and may also include the first few samples following sample 1, e.g., sample 2, sample 3, etc. The end sample(s) may include the last sample in the sequence for the symbol according to a time domain, e.g., sample N, and may also include a few samples just prior to sample N in the sequence, e.g., sample N−1, sample N−2, etc. By combining PT-RS with a pre-DFT sequence of symbols for a data transmission in sample locations that are less affected by the window effect, e.g., in sample locations different than a beginning and/or end sample(s) of the pre-DFT sample sequence for a symbol or interval, may reduce uncertainty for a receiver attempting to receive and extract the PT-RS from the received signal.

Figure 7A:
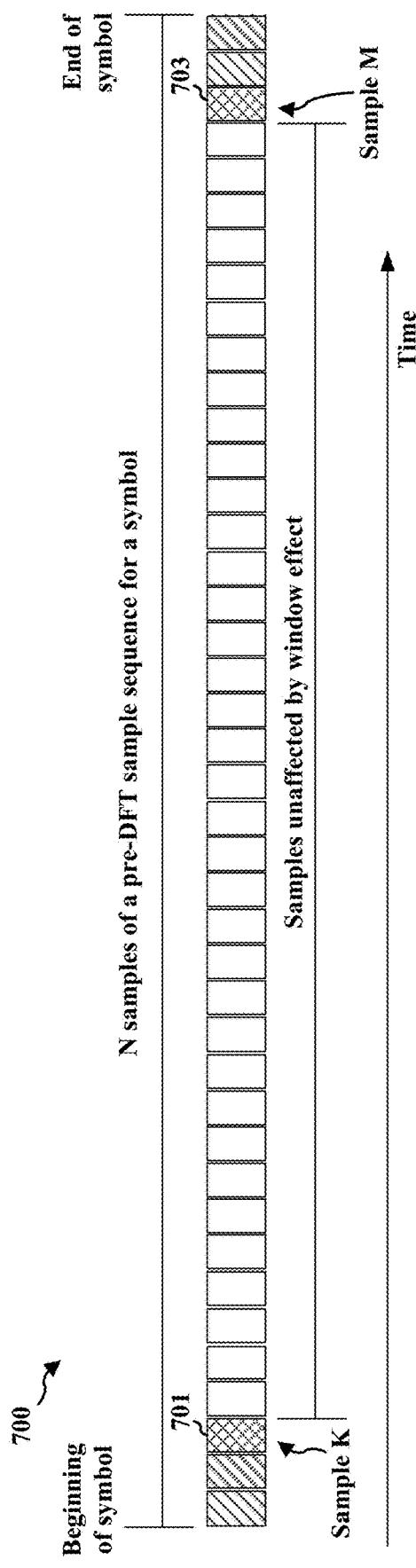
FIGS. 7A and 7B illustrate aspects of example PT-RS patterns in relation to pre-DFT sample sequences for a symbol.

Thus, a PT-RS pattern may reduce a potential window effect that may be experienced at a receiver that will receive the PT-RS. For example, when inserting PT-RS in beginning and/or end sample(s) in the time (pre-DFT) sample sequence for a symbol, the PT-RS pattern may avoid regions that may be subject to the window effect at the receiver. Thus, the PT-RS insertion pattern may avoid a beginning and/or end region of the sequence of samples for a symbol that may experience a potential window effect. The PT-RS pattern may insert the PT-RS in at least one region of samples that is less likely to be subject to a window effect, e.g., a region other than the regions containing the beginning and/or end samples in the pre-DFT sample sequence for a symbol. FIG. 7A illustrates an example 700 of a pre-DFT sample sequence of N samples for a symbol, according to a time domain. The number N of samples corresponds to the N of the N point DFT applied at the transmitter, which also corresponds to the N of the N point IDFT that will be applied at the receiver, and the size of the N length pre-DFT sample sequence. In the example 702, the first sample through the Kth sample for the symbol may be affected by the window effect at the receiver. At the end of the pre-DFT sample sequence, e.g., the Mth sample through the last sample in the sequence may be affected by the window effect. The affected samples correspond to the beginning samples and the ending samples of the pre-DFT sequence in the symbol, due to the circulant structure of the IDFT that will be applied at the receiver. Thus, sample K 701 may be a boundary sample in the pre-DFT sample sequence that is identified as possibly being subject to the window effect at the receiver, where the sample(s) following the K-th sample might not be subject to the window effect, or may be less likely to be subject to the window effect. Similarly, sample M 703 may be a second boundary sample that is identified as possibly being subject to the window effect at the receiver, where the sample(s) prior to sample M might not be subject to the window effect or may be more likely to be subject to the window effect. In FIG. 7A, two consecutive subsets of the N samples for the pre-DFT sequence of samples for a symbol are identified as being subject to the window effect at the receiver, a first subset comprising the $1^{st}$ sample through the $K^{th}$ sample and a second subset comprising the $N^{th}$–$M^{th}$ sample through the $M^{th}$ sample. A third subset of samples between the $K^{th}$ sample and the $M^{th}$ sample are identified as being unaffected or less likely to be affected by the window affect at the receiver.

At the transmitter, the PT-RS may be inserted according to a pattern that avoids the regions affected by the window effect, e.g., that avoids the two subsets of samples at the beginning and end of the symbol that are identified as being subject to the window effect. Thus, the PT-RS pattern may insert the PT-RS at samples other than the beginning and/or end samples, e.g., comprising samples between 701 and 703. This enables the PT-RS pattern to insert the PT-RS signal into a set of samples that are not subject to the receiver side window effect, e.g., samples different than the beginning and/or end sample(s). Thus, the PT-RS pattern may avoid applying the PT-RS signal in a set of samples that are potentially subject to a receiver side window effect.

The affected samples may be identified based on a channel delay spread estimate. For example, a transmitter may identify an estimate of the delay spread of the channel. The estimate may be the length of the cyclic prefix (CP). Then, the transmitter may identify a number of samples that may be affected by the window effect, e.g., at the beginning and end of a symbol based on the channel delay spread estimate. The identified samples may comprise a first number of samples at the beginning of the symbol and/or a second number of samples at the end of the symbol. For example, the identified samples may comprise a number of samples based on a function Q=S*J/L. Q corresponds to the number of samples, S corresponds to the channel delay spread estimate, J corresponds to a Fast Fourier Transform (FFT) size, and L corresponds to a Discrete Fourier Transform (DFT) size of the Discrete Fourier Transform spread Orthogonal Frequency-Division Multiplexing (DFT-s-OFDM). Thus, the PT-RS pattern may be based on, e.g., a function of, any combination of a channel delay spread estimate, an FFT size, a DFT size of the DFT-s-OFDM. The PT-RS pattern may be proportional to S*J/L. This is one example of a predefined formula upon which the PT-RS pattern may be based. In one example, the identified samples may include Q samples at the beginning of the symbol and Q samples at the end of the symbol. Thus, the number of samples that are identified to be affected by the window effect at the beginning of the symbol may be the same as the number of samples that are identified to be affected by the window effect at the end of the symbol. In another example, the number of samples that are identified to be affected by the window effect at the beginning of the symbol may be different than the number of samples that are identified to be affected by the window effect at the end of the symbol.

At the receiver, an algorithm may be applied to recover a phase trajectory that takes into account the circulant structure of the IDFT in order to minimize the window effect. For example, the phase error trajectory may be estimated in a piecewise manner. A first estimate, or interpolation, of the phase trajectory may be made for the samples K+1 through N−M−1, e.g., the samples that are identified as being unaffected by the window effect at the receiver. Then, a second estimate, or interpolation, of a phase trajectory may be made for the $1^{st}$ sample through the $K^{th}$ sample and the N−$M^{th}$ sample through the $M^{th}$ sample, e.g., the two subsets of samples that are potentially subject to the window effect at the receiver.

Figure 7B:
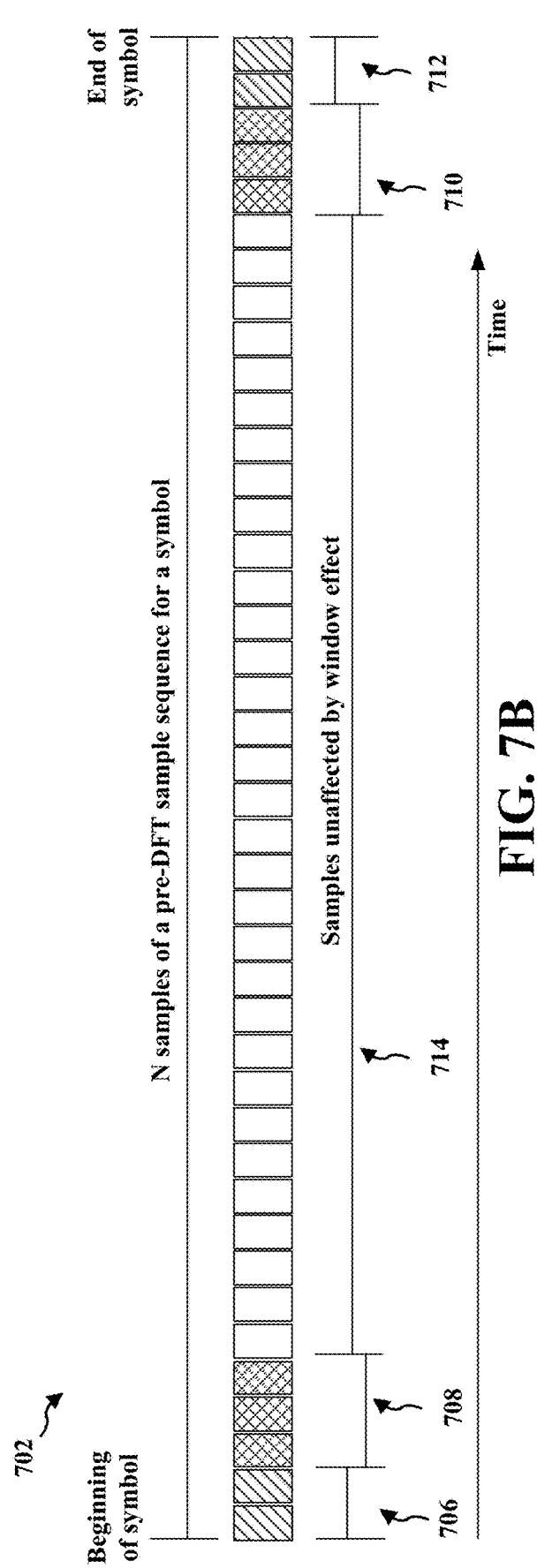

FIG. 7B illustrates a second example in which a group of samples 706 at the beginning of a sequence for a symbol and a group of samples 712 at an end of a sequence for a symbol may be identified as being heavily impacted by the window effect. A second group of samples 708 at the beginning of the sequence for a symbol and a second group of samples 710 at an end of a sequence for a symbol may be identified as being potentially impacted by the window effect. The PT-RS pattern may be selected to avoid inserting PT-RS in the groups of samples 706, 712 that are heavily impacted by the window effect and/or the groups of samples 708, 710 that may be impacted by the window effect to a lesser degree. The PT-RS pattern may insert PT-RS into the samples 712 of the symbol that are identified to be unaffected by the window effect and may even limit PT-RS insertion to the samples 714 of the symbol that are identified to be unaffected by the window effect.

Figure 8:
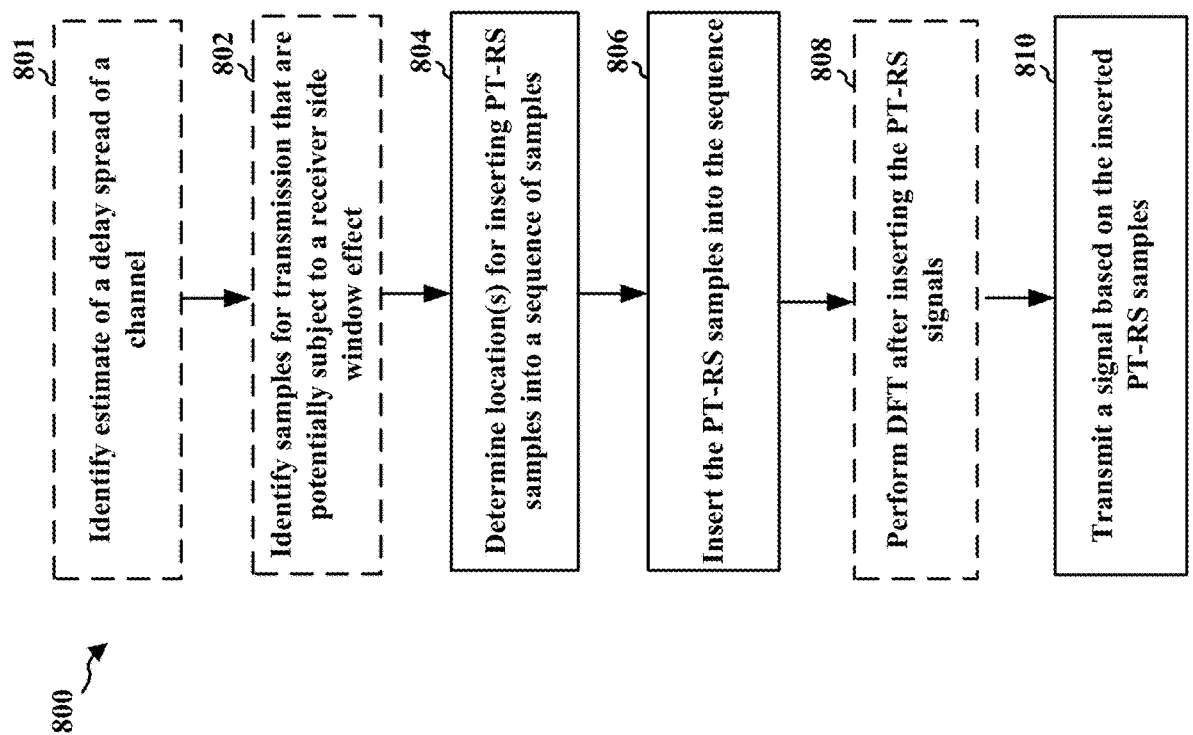
FIG. 8 is a flowchart of a method of wireless communication.

FIG. 8 is a flowchart 800 of a method of wireless communication at a transmitter apparatus. The method may be performed by a transmitting apparatus, such as a UE (e.g., 104, 350, the apparatus 902/902'), or a gNB (e.g. in a wireless backhaul networks). Optional aspects are illustrated with a dashed line.

At 804, the apparatus may determine at least one location for inserting PT-RS samples into a sequence of a plurality of samples. A first set of the plurality of samples may comprises at least one of a first number of samples at a beginning of the sequence and a second number of samples at an end of the sequence, and the at least one location for the PT-RS samples may be within a second set of the plurality of samples. The first set of the plurality of the samples may be identified as potentially subject to a receiver side window effect, e.g., such as the beginning samples and/or end samples of the sequence of samples described in connection with FIGS. 7A and 7B. For example, at 802, the apparatus may optionally identify samples for transmission that are potentially subject to a receiver side window effect. The second set of the plurality of samples might not be subject to the receiver side window effect. For example, the at least one location may comprise samples other than the beginning and/or end samples. The at least one location of the PT-RS samples may avoid inserting the PT-RS signals in the first set of the plurality of samples that are potentially subject to a receiver side window effect, such as the second set of the plurality of samples, in which the at least one location for the insertion of PT-RS is located, may comprise samples that are less likely to be subject to the receiver side window effect.

The plurality of samples may comprise samples of a symbol of a DFT-s-OFDM transmission. The first set of the plurality of samples that may be subject to a receiver side window effect may be identified based on a predefined formula and/or received signaling. Similarly, the at least one location for inserting the PT-RS samples may be determined based on a predefined formula. For example, the apparatus may receive signaling from a second wireless device from which the apparatus may identify samples in its own transmission that may be subject to a window effect at the receiver. The samples may be identified based on at least one of a cyclic shift of the samples or an FFT operation window location that a second wireless device performs to a symbol. For example, the samples may be identified based on a set of samples in a symbol that a second wireless device uses for an FFT operation. The set of samples in the symbol that the second wireless device uses for the FFT operation may be determined based on at least one of a predefined method, a length of a cyclic prefix in a transmission, and an indication from the second device. The set of samples that the second wireless device uses for the FFT operation may correspond to a cyclic shift of a subset of the samples in a received symbol. Thus, the first set of samples, which are potentially subject to a receiver side window effect, may be based on a third set of samples in a symbol that a second wireless device uses for an FFT operation, which may be based on at least one of a predefined method, a length of a cyclic prefix in a transmission, and an indication from the second device. The first set samples may comprise at least one of a first number of samples, e.g., K samples, at a beginning of a symbol or a second number of samples, e.g., M samples, at an end of a symbol. The third set of samples that the second wireless device uses for the FFT operation may correspond to a cyclic shift of a subset of the plurality of samples in the symbol. The samples at the beginning of the pre-DFT sample sequence for a symbol are the first/first few samples in the pre-DFT sequence, as illustrated in connection with the sample sequence in FIGS. 7A and 7B for a symbol. The first few samples of the pre-DFT sequence may also be referred to herein as the "head" of the sequence. Similarly, the M samples at the end of the pre-DFT sample sequence for the symbol are the samples corresponding to the last samples within the pre-DFT sample sequence, including the final/last sample at the end the sequence or the last few samples at the end of the sequence, as illustrated in connection with FIGS. 7A and 7B. The last few samples of the pre-DFT sequence may also be referred to herein as the "tail" of the sequence. K and M may be based on the tone spacing of the apparatus transmitting the transmission. FIGS. 7A and 7B illustrate examples of identified samples that may be subject to a receiver side window effect. The first number of samples at the beginning of the pre-DFT sample sequence for a symbol and/or the second number of samples at the end of the pre-DFT sample sequence for the symbol may be defined based on a predefined formula. Likewise, the PT-RS pattern may be determined based on a predefined formula.

The first set of the plurality of samples in the sequence, which may be subject to the window effect, may comprise at least one of a first number of samples at a beginning of a pre-DFT sample sequence and/or a second number of samples at an end of the pre-DFT sample sequence. In one example, the first number of samples and/or the second number of samples may be based on a channel delay spread estimate. For example, at 801, the apparatus may identify an estimate of a delay spread of a channel. The estimate of the delay spread of the channel may comprise the length of the CP. The first number of samples and the second number of samples may be based on any combination of an estimate of the delay spread of the channel, an FFT size, and a DFT of a DFT-s-OFDM. For example, the corresponding number (Q) of samples may be based on a predefined formula, e.g., based on a function in which Q is proportional to S*J/L, where Q corresponds to the number of samples, S corresponds to the estimated delay spread of the channel, J corresponds to the FFT size, and L corresponds to the DFT size of the DFT-S-OFDM. Thus, the numbers PT-RS pattern may be based on any combination of S, J, and L. The first number of samples at the beginning of the pre-DFT sample sequence and the second number of samples at the end of the pre-DFT DFT sample sequence may be the same. In another example, the first number of samples and the second number of samples may be different.

At 806, the apparatus may insert the PT-RS samples into the sequence based on the determined at least one location. As illustrated at 502 in FIG. 5, the PT-RS signals b1, b2, . . . may be inserted along with the data a1, a2, a3, . . . in accordance with the determined location(s) from 804.

At 810, the apparatus may transmit a signal based on the inserted PT-RS samples, e.g., inserted into the sequence of samples.

The transmission may comprise a DFT-s-OFDM transmission that is processed for transmission, e.g., as described in connection with FIG. 5. Thus, the apparatus may perform DFT at 808 on the plurality of samples after inserting the PT-RS samples into the plurality of samples of the pre-DFT sample sequence. FIG. 5 illustrates DFT performed at 506 after PT-RS insertion at 502.

As illustrated in FIGS. 7A and 7B, the first set of samples may comprise at least one of a first boundary sample, e.g., Kth sample, at a beginning of the pre-DFT sample sequence for a symbol and/or a second boundary sample, e.g., Mth sample, at an end of the pre-DFT sample sequence for a symbol. As illustrated in FIG. 7A, a third set of samples extending from the beginning of the pre-DFT sample sequence for the symbol to the first boundary sample, Kth sample, may potentially be affected by the receiver side window effect. The third set of samples corresponds to sample 1 to sample K in FIG. 7A. Similarly, a fourth set of samples extending from the second boundary sample, Mth sample, to the end of the pre-DFT sample sequence for the symbol may potentially be affected by the receiver side window effect. The fourth set of samples corresponds to sample M to sample N, where N is the last sample in a set of N samples. The at least one location may be determined such that it does not include at least one of the first boundary sample, the second boundary sample, the third set of samples, or the fourth set of samples, e.g., avoiding samples 1 to K and samples M to N. The location(s) may include at least one sample between the first boundary sample and the second boundary sample, e.g., in the interval of samples K+1 to K+k and N−M−m to N−M−1, where k and m are integers greater than zero, and (k+m) is the number of PT-RS samples used in the transmission. Thus, at least part of the PT-RS samples may be inserted in the interval of samples of the pre-DFT sample sequence at a location that is not potentially subject to the window effect at the receiver.

Figure 9:
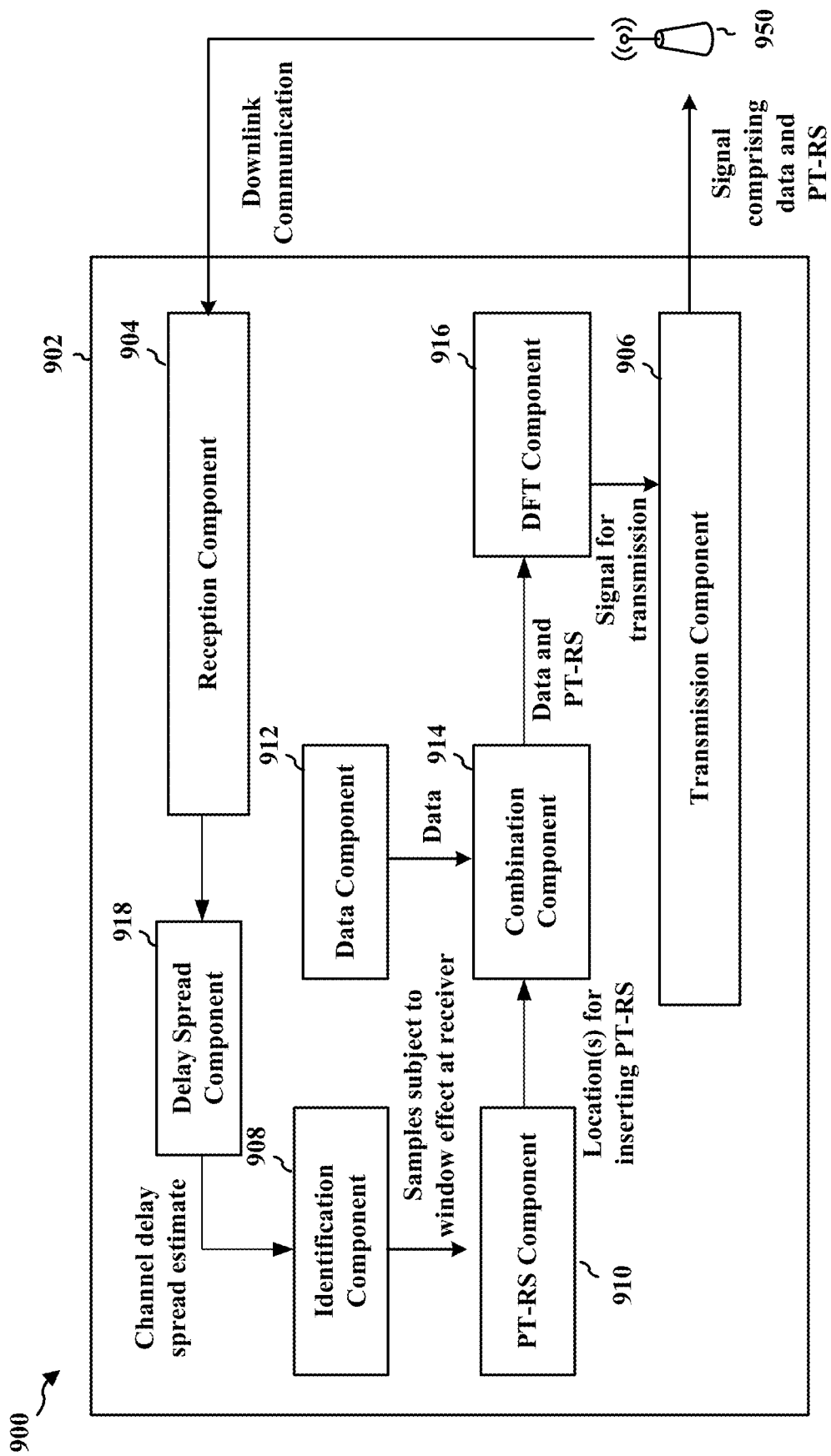
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a transmitting apparatus such as a UE (e.g., UE 104, 350, 1250). The apparatus includes a reception component 904 that receives wireless communication such as downlink communication from a base station 950 and/or wireless signaling from other wireless devices. The apparatus includes a transmission component 906 configured to transmit a wireless transmission to a receiving device. The transmission may comprise a DFT-s-OFDM transmission, such as described in connection with FIG. 5. The apparatus may include a PT-RS component 910 that is configured to determine at least one location for inserting PT-RS samples into a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples, as described in connection with 804 in FIG. 8 and FIGS. 7A and 7B. The apparatus may include an identification component 908 configured to identify samples for transmission that are potentially subject to a receiver side window effect, as described in connection with 801 in FIG. 8 and FIGS. 7A and 7B. The location may be based on a predefined formula and/or received signaling from another wireless device. The location may be based on a channel delay spread estimate. For example, the apparatus may include a delay spread component 918 configured to identify an estimate of a delay spread of a channel. The first set of samples may comprise a first number of samples at a beginning of a pre-DFT sample sequence for a symbol and/or a second number of samples at an end of the pre-DFT sample sequence for the symbol. The first number of samples and the second number of samples may be based on the estimate of the delay spread of the channel, e.g., as described in connection with FIGS. 7A and 7B.

The determined location(s) may be provided to a combination component 914 that inserts PT-RS samples into the sample sequence, e.g., with data samples from a data component 912 based on the determined location. The apparatus may include a DFT component 916 configured to perform DFT on the samples after inserting the PT-RS samples into the plurality of samples, e.g., as described in connection with 808 in FIG. 8 and FIG. 5. The transmission component 906 may be configured to transmit a signal based on the inserted PT-RS samples.

The apparatus may include additional components that perform each of the blocks of the algorithm in the flowchart of FIG. 8. As such, each block in the flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
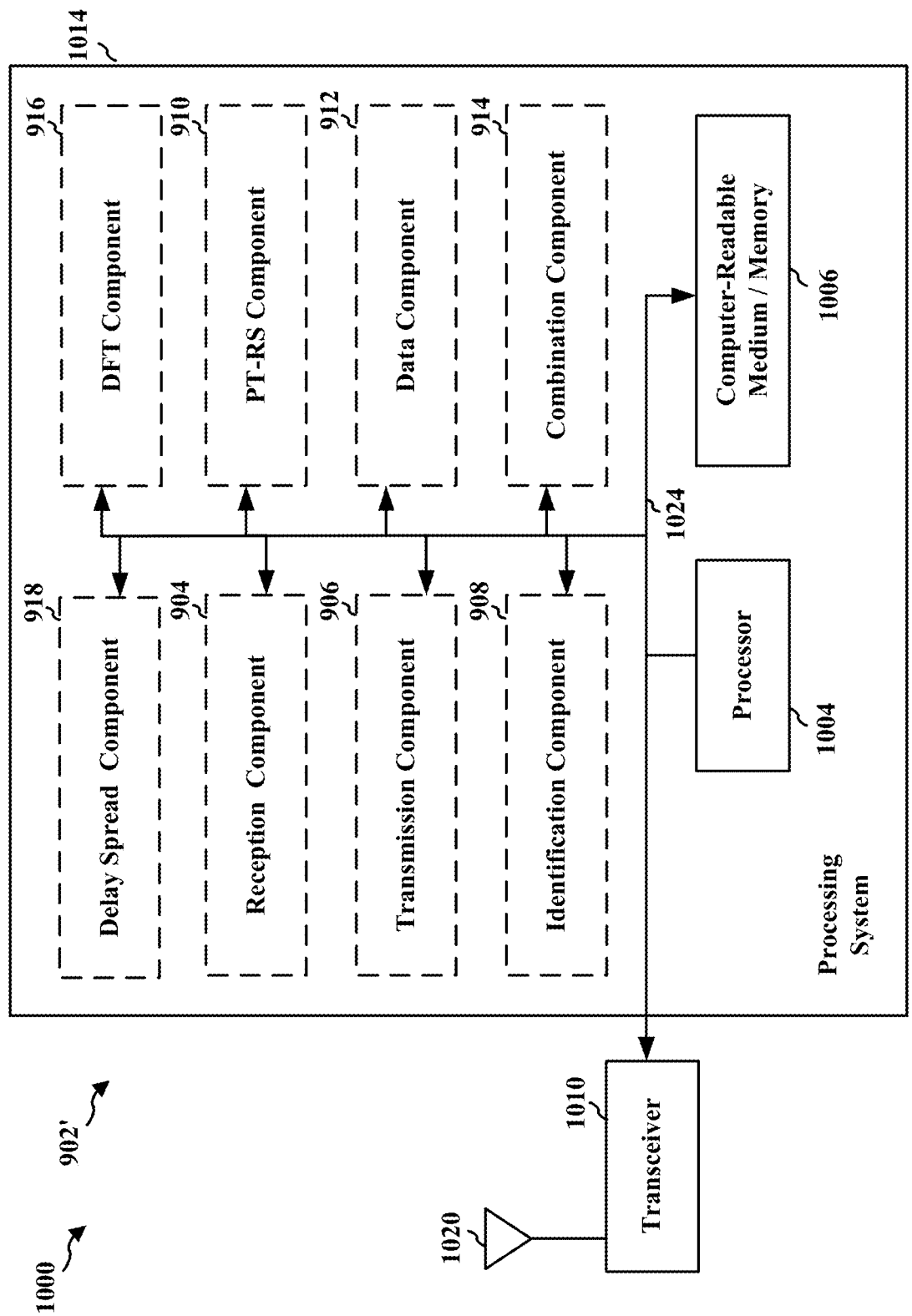
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes any of means for identifying samples of a pre-DFT sample sequence that are potentially subject to a receiver side window effect, means for identifying an estimate of a delay spread of a channel, means for determining at least one location for inserting PT-RS samples into a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples, means for inserting the PT-RS samples into the sequence based on the determined at least one location, means for transmitting a signal based on the inserted PT-RS samples, and means for performing DFT on the samples after inserting the PT-RS samples into the plurality of samples. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
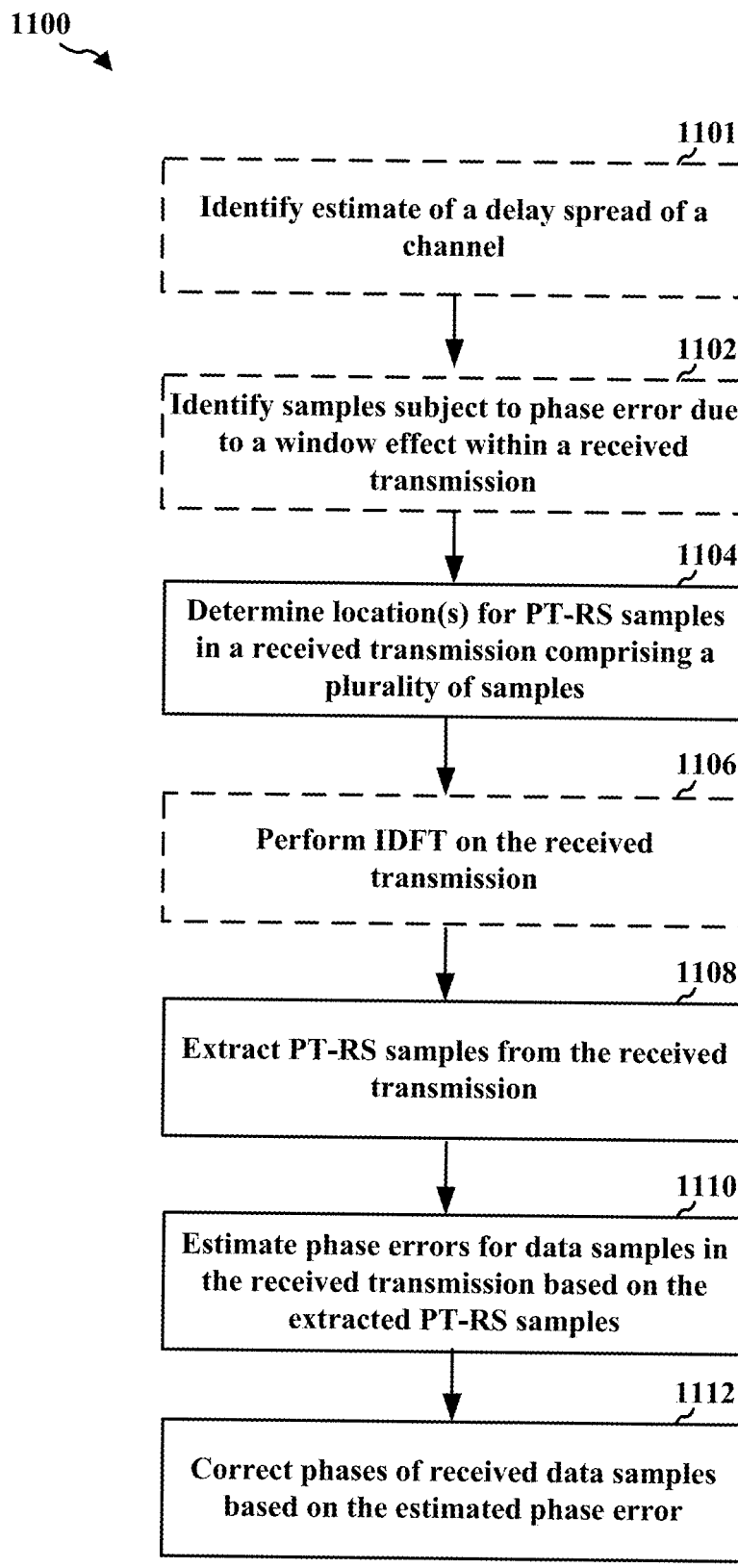
FIG. 11 is a flowchart of a method of wireless communication.

FIG. 11 is a flowchart 1100 of a method of wireless communication. The method may be performed by a receiving device, such as a base station (e.g., base station 102, 180, 310, 950, the apparatus 1202/1202'). The receiving device may receive a DFT-s-OFDM transmission and may process the transmission as described in connection with FIG. 5. Optional aspects are illustrated with a dashed line.

At 1104, the apparatus determines at least one location for PT-RS samples in a received transmission comprising a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples. The first set of the plurality of samples may be potentially subject to a phase error due to a window effect. The second set of samples may avoid the samples that are potentially subject to the window effect. Thus, determined location may be limited to a set of samples extending from the K+1 sample to the M−1 sample. Thus, the second set of samples may comprise samples that are not subject to the receiver side window effect.

At 1102, the apparatus may identify samples within a received transmission that are potentially subject to phase error due to a window effect.

The first set of samples may comprise at least one of a first number K of samples at a beginning of a pre-DFT sample sequence for a symbol and a second number M of samples at the end of the pre-DFT sample sequence for the symbol, e.g., as described in connection with FIGS. 7A and 7B. The first number K of samples at the beginning of the pre-DFT sample sequence for the symbol and the second number M of samples at the end of the pre-DFT sample sequence for the symbol may be based on the tone spacing of a user equipment transmitting the received transmission. The first number K of samples at the beginning of the pre-DFT sample sequence for the symbol and the second number M of samples at the end of the pre-DFT sample sequence for the symbol may be independent of a scheduled bandwidth or a DFT size used by a user equipment in the received transmission. The first number of samples at the beginning of the sequence and the second number of samples at the end of the sequence may be identified based on a predefined formula. Similarly, the at least one location for the PT-RS samples may be determined based on a predefined formula. The location(s) may be identified based on at least one of a cyclic shift of the samples or a Fast Fourier Transform operation window location that a second wireless device performs to a symbol. For example, the location(s) may be identified based on a set of samples, e.g., a third set of samples, in a pre-DFT sample sequence for the symbol that a second wireless device uses for an FFT operation. The third set of samples in the symbol that the second wireless device uses for the FFT operation may be based on at least one of a predefined method, a length of a cyclic prefix in a transmission, and an indication from a second device. The third set of samples that the second wireless device uses for the FFT operation may correspond to a cyclic shift of a subset of the plurality of samples in the symbol.

In one example, the identified samples may be based on a channel delay spread estimate. For example, at 1101, the apparatus may identify an estimate of a delay spread of a channel. The estimate of the delay spread of the channel may be the length of the CP. The location may be based on a set of samples in a symbol that the receiving device uses for a Fast Fourier Transform operation. The identified samples may comprise a first number of samples at a beginning of a pre-DFT sample sequence for the symbol and a second number of samples at an end of the pre-DFT sample sequence for the symbol, wherein the first number of samples and the second number of samples are based on the estimate of the delay spread of the channel. The corresponding number (Q) of samples may be based on a function in which Q is proportional to $S*J/L$, where Q corresponds to the number of samples, S corresponds to the estimated delay spread of the channel, J corresponds to the FFT size, and L corresponds to the DFT size of the DFT-S-OFDM. Thus, the first and/or second number of samples, and therefore the locations may be based on any combination of S, J, and L. In one example, the first number of samples may be the same number as the second number of samples. In another example, the first number of samples may comprise a different number that the second number of samples.

In an example, the first number of samples at the beginning of the symbol and the second number of samples at the end of the symbol may be identified independent of a scheduled bandwidth or a Discrete Fourier Transform size used by a user equipment in the received transmission. In another example, the first number of samples at the beginning of the symbol and the second number of samples at the end of the symbol may be identified based on a spacing of a user equipment transmitting the received transmission.

The first set of the plurality of samples may include at least one of a first boundary sample at a beginning of a pre-DFT sample sequence for a symbol and a second boundary sample at an end of the pre-DFT sample sequence for the symbol, wherein a third set of samples extending from the beginning of the pre-DFT sample sequence for the symbol to the first boundary sample are potentially affected by the receiver side window effect, or wherein a fourth set of samples extending from the second boundary sample to the end of the pre-DFT sample sequence for the symbol are potentially affected by the receiver side window effect. The at least one location determined at 1104 might not include at least one of the first boundary sample, the second boundary sample, the third set of samples, or the fourth set of samples.

At 1106, the apparatus may perform IDFT on the received transmission before extracting the PT-RS signals, wherein the IDFT imposes a circulant structure on output samples, as described in connection with FIGS. 5 and 6.

At 1108, the apparatus extracts PT-RS signals from the received transmission based on the identified PT-RS pattern, e.g., as illustrated at 532 in FIG. 5.

At 1110, the apparatus estimates phase errors for data samples in the received transmission based on the extracted PT-RS signals. The phase errors for data samples may be estimated based on a circulant structure of a phase error sequence. Estimation of the phase errors may comprise a first estimation for a first set of samples and a second estimation for a second set of samples, wherein the first set of samples are identified to comprise a window effect and the second set of samples are identified without a window effect. Thus, the phase error estimation may be performed in a piecewise manner for regions identified as being subject to the window effect and for regions without a window effect.

At 1112, the apparatus corrects phases of received data samples based on the estimated phase errors, as described in connection with FIG. 5.

Figure 12:
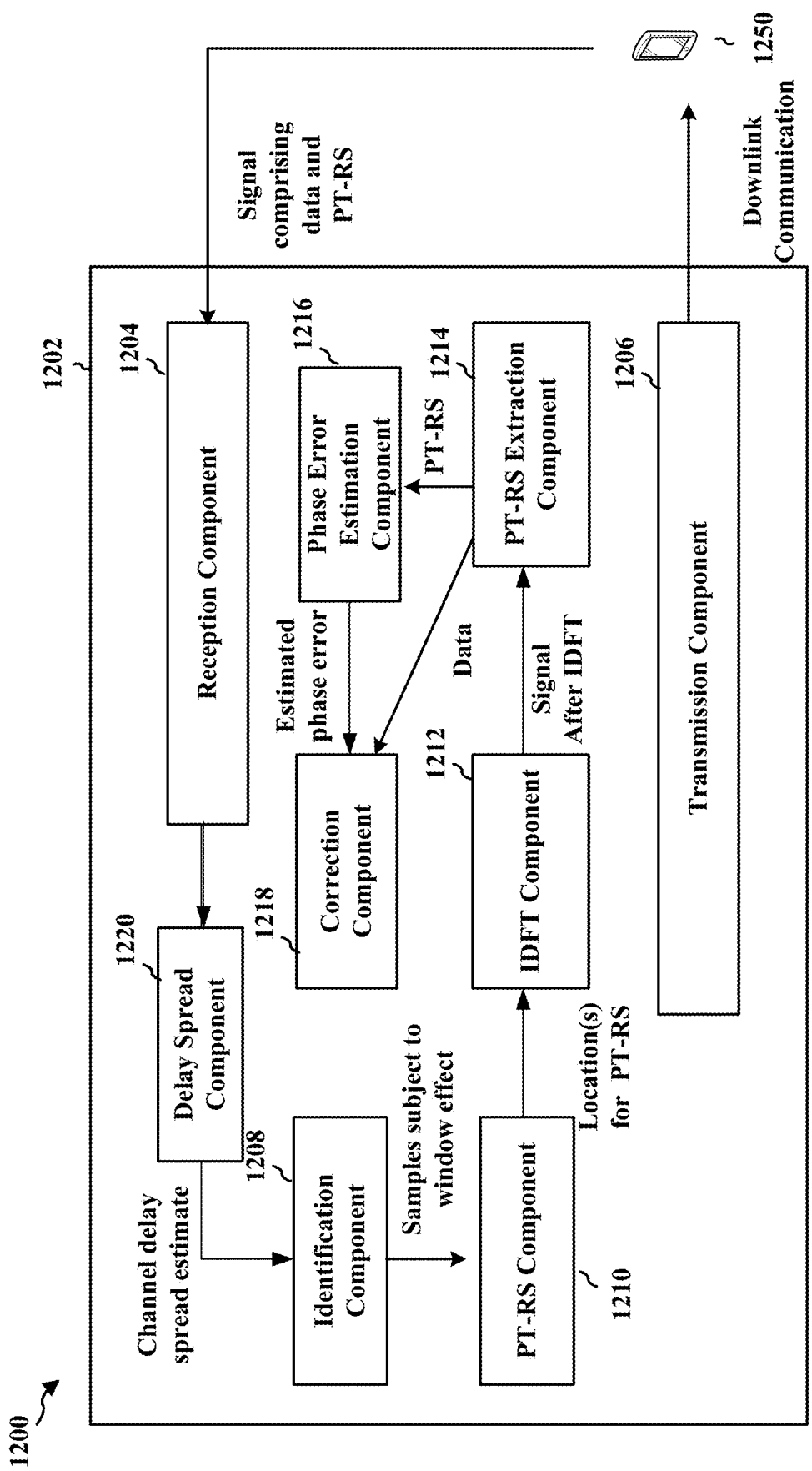
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a receiving apparatus, such as a base station (e.g., base station 102, 180, 310, 950). The apparatus includes a reception component 1204 that receives a wireless transmission from a transmitting device, e.g., such as a user equipment 1250. The apparatus includes a transmission device 1206 configured to transmit wireless communication, e.g., to the user equipment 1250.

The apparatus may include an identification component 1208 configured to identify samples within a received transmission wherein the samples are subject to phase error due to a window effect, as described in connection with FIGS. 7A and 7B. The identification may be based on a channel delay spread estimate. For example, the apparatus may include a delay spread component 1220 configured to identify an estimate of a delay spread of a channel. The identified samples may comprise a first number of samples at a beginning of a pre-DFT sample sequence for a symbol and a second number of samples at an end of the pre-DFT sample sequence for a symbol, wherein the first number of samples and the second number of samples are based on the estimate of the delay spread of the channel, e.g., as described in connection with FIGS. 7A and 7B.

The apparatus may include a PT-RS component 1210 configured determine at least one location for PT-RS samples in a received transmission comprising a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples. The apparatus may include an IDFT component 1212 configured to perform IDFT on the received transmission before extracting the PT-RS samples, wherein the IDFT imposes a circulant structure on output samples. The apparatus may include a PT-RS extraction component 1214 configured to extract PT-RS samples from the received transmission based on the determined location(s). The apparatus may comprise a phase error estimation component 1216 configured to estimate phase errors for data samples in the received transmission based on the extracted PT-RS samples. The apparatus may include a correction component 1218 configured to correct phases of received data samples based on the estimated phase errors.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
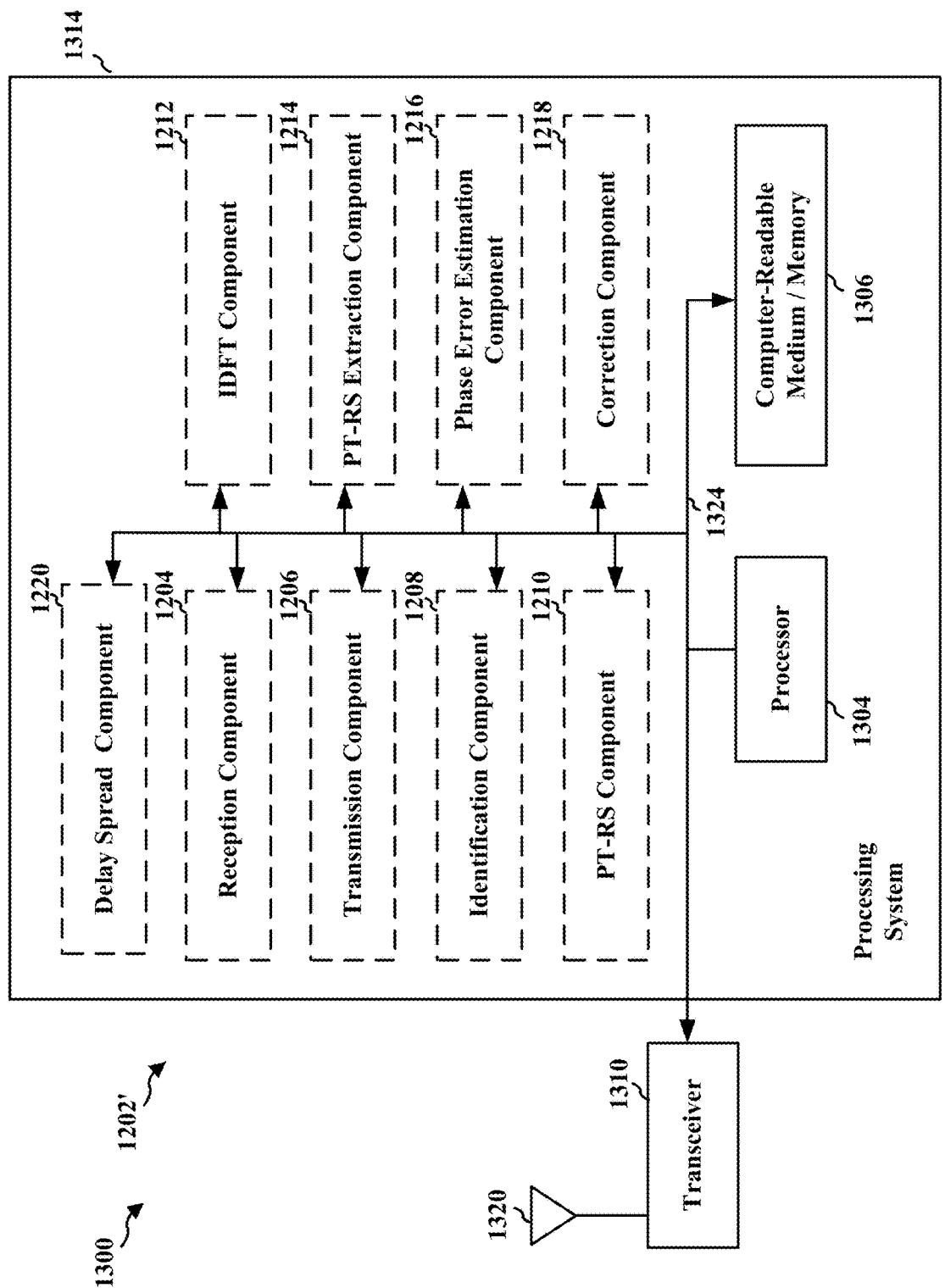
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for identifying samples within a received transmission that are potentially subject to phase error due to a window effect, means for determining at least one location for PT-RS samples in a received transmission comprising a sequence of a plurality of samples, wherein a first set of the plurality of samples comprises at least one of a first number of samples at a beginning of the sequence and a second number of samples at an end of the sequence, and wherein the at least one location for the PT-RS samples is within a second set of the plurality of samples, means for extracting the PT-RS samples from the received transmission based on the determined at least one location, means for identifying an estimate of a delay spread of a channel, means for estimating phase errors for data samples in the received transmission based on the extracted PT-RS samples, means for performing IDFT on the received transmission before extracting the PT-RS samples, wherein the IDFT imposes a circulant structure on output samples, and means for correcting phases of received data samples based on the estimated phase errors. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, comprising:
   determining at least one location for inserting phase tracking reference signal (PT-RS) samples into a sequence of a plurality of samples in a time domain, wherein a first set of the plurality of samples comprises at least one of a first number of samples at a beginning of the sequence and a second number of samples at an end of the sequence, and wherein the at least one location for the PT-RS samples is within a second set of the plurality of samples;
   inserting the PT-RS samples into the sequence based on the at least one location, wherein the at least one location of the PT-RS samples excludes the first set of the plurality of samples; and
   transmitting a signal based on the inserted PT-RS samples.

2. The method of claim 1, further comprising:
   performing Discrete Fourier Transform (DFT) on the plurality of samples after inserting the PT-RS samples into the plurality of samples.

3. The method of claim 1, wherein the first set of the plurality of samples are identified as being subject to a receiver side edge effect.

4. The method of claim 3, wherein the first number of samples at the beginning of the sequence and the second number of samples at the end of the sequence are identified based on a predefined formula.

5. The method of claim 1, wherein the at least one location for the PT-RS samples is determined based on a predefined formula.

6. The method of claim 1, wherein the first set of the plurality of samples are subject to a receiver side window effect.

7. The method of claim 1, wherein the second set of the plurality of samples comprises samples that are less likely to be subject to a receiver side window effect.

8. The method of claim 1, further comprising:
   identifying an estimate of a delay spread of a channel.

9. The method of claim 8, wherein the estimate of the delay spread comprises a length of a cyclic prefix (CP).

10. The method of claim 8, wherein the first set of the plurality of samples comprises at least one of the first number of samples at a beginning of a pre-DFT sample sequence for a symbol and the second number of samples at an end of the pre-DFT sample sequence for the symbol, wherein the first number of samples and the second number of samples are based on the estimate of the delay spread of the channel.

11. The method of claim 10, wherein at least one of the first number of samples and the second number of samples are based on at least one of the estimate of the delay spread of the channel, a Fast Fourier Transform (FFT) size, and a Discrete Fourier Transform (DFT) size of a Discrete Fourier Transform spread Orthogonal Frequency-Division Multiplexing (DFT-s-OFDM).

12. The method of claim 10, wherein at least one of the first number of samples and the second number of samples are proportional to S*J/L, where S corresponds to the estimate of the delay spread of the channel, J corresponds to a Fast Fourier Transform (FFT) size, and L corresponds to a Discrete Fourier Transform (DFT) size of a Discrete Fourier Transform spread Orthogonal Frequency-Division Multiplexing (DFT-s-OFDM).

13. The method of claim 1, wherein the first set of the plurality of samples are based on a third set of samples in a symbol that a second wireless device uses for a Fast Fourier Transform (FFT) operation.

14. The method of claim 13, wherein the third set of samples in the symbol that the second wireless device uses for the FFT operation are based on at least one of a predefined method, a length of a cyclic prefix in a transmission, and an indication from a second device.

15. The method of claim 13, where the third set of samples that the second wireless device uses for the FFT operation correspond to a cyclic shift of a subset of the plurality of samples in the symbol.

16. The method of claim 1, wherein the first set of the plurality of samples includes at least one of a first boundary sample at a beginning of a pre-DFT sample sequence for a symbol and a second boundary sample at an end of a pre-DFT sample sequence for the symbol,
    wherein a third set of samples extending from the beginning of the pre-DFT sample sequence for the symbol to the first boundary sample are affected by a receiver side window effect, or
    wherein a fourth set of samples extending from the second boundary sample to the end of the pre-DFT sample sequence for the symbol are affected by the receiver side window effect, and
    wherein the at least one location does not include at least one of the first boundary sample, the second boundary sample, the third set of samples, or the fourth set of samples.

17. The method of claim 16, wherein the at least one location includes at least one sample between the first boundary sample and the second boundary sample.

18. An apparatus for wireless communication, comprising:
    a memory; and
    at least one processor coupled to the memory and configured to:
        determine at least one location for inserting phase tracking reference signal (PT-RS) samples into a sequence of a plurality of samples in a time domain, wherein a first set of the plurality of samples comprises at least one of a first number of samples at a beginning of the sequence and a second number of samples at an end of the sequence, and wherein the at least one location for the PT-RS samples is within a second set of the plurality of samples;
        insert the PT-RS samples into the sequence based on the at least one location, wherein the at least one location of the PT-RS samples excludes the first set of the plurality of samples; and
        transmit a signal based on the inserted PT-RS samples.

19. The apparatus of claim 18, wherein the at least one processor is further configured to:
    perform Discrete Fourier Transform (DFT) on the plurality of samples after inserting the PT-RS samples into the plurality of samples.

20. The apparatus of claim 18, wherein the first set of the plurality of samples are subject to a receiver side window effect.

21. The apparatus of claim 18, wherein the second set of the plurality of samples comprises samples that are less likely to be subject to a receiver side window effect.

22. The apparatus of claim 18, wherein the at least one processor is further configured to:
    identify an estimate of a delay spread of a channel.

23. The apparatus of claim 22, wherein the first set of the plurality of samples comprises at least one of the first number of samples at a beginning of a pre-DFT sample sequence for a symbol and the second number of samples at an end of the pre-DFT sample sequence for the symbol, wherein the first number of samples and the second number of samples are based on the estimate of the delay spread of the channel.

24. The apparatus of claim 23, wherein at least one of the first number of samples and the second number of samples are based on at least one of the estimate of the delay spread of the channel, a Fast Fourier Transform (FFT) size, and a Discrete Fourier Transform (DFT) size of a Discrete Fourier Transform spread Orthogonal Frequency-Division Multiplexing (DFT-s-OFDM).

25. The apparatus of claim 18, wherein the first set of the plurality of samples includes at least one of a first boundary sample at a beginning of a pre-DFT sample sequence for a symbol and a second boundary sample at an end of the pre-DFT sample sequence for the symbol,
    wherein a third set of samples extending from the beginning of the pre-DFT sample sequence for the symbol to the first boundary sample are affected by a receiver side window effect, or
    wherein a fourth set of samples extending from the second boundary sample to the end of the pre-DFT sample sequence for the symbol are affected by the receiver side window effect, and
    wherein the at least one location does not include at least one of the first boundary sample, the second boundary sample, the third set of samples, or the fourth set of samples.

26. The apparatus of claim 25, wherein the at least one location includes at least one sample between the first boundary sample and the second boundary sample.

27. An apparatus for wireless communication at a transmitting device, comprising:
    means for determining at least one location for inserting phase tracking reference signal (PT-RS) samples into a sequence of a plurality of samples in a time domain, wherein a first set of the plurality of samples comprises at least one of a first number of samples at a beginning of the sequence and a second number of samples at an end of the sequence, and wherein the at least one location for the PT-RS samples is within a second set of the plurality of samples;
    means for inserting the PT-RS samples into the sequence based on the at least one location, wherein the at least one location of the PT-RS samples excludes the first set of the plurality of samples; and
    means for transmitting a signal based on the inserted PT-RS samples.

28. The apparatus of claim 27, further comprising:
means for performing Discrete Fourier Transform (DFT) on the plurality of samples after inserting the PT-RS samples into the plurality of samples.

29. The apparatus of claim 27, further comprising:
means for identifying an estimate of a delay spread of a channel.

30. A computer-readable medium storing computer executable code for wireless communication at a transmitting device, comprising code to:
determine at least one location for inserting phase tracking reference signal (PT-RS) samples into a sequence of a plurality of samples in a time domain, wherein a first set of the plurality of samples comprises at least one of a first number of samples at a beginning of the sequence and a second number of samples at an end of the sequence, and wherein the at least one location for the PT-RS samples is within a second set of the plurality of samples;
insert the PT-RS samples into the sequence based on the at least one location, wherein the at least one location of the PT-RS samples excludes the first set of the plurality of samples; and
transmit a signal based on the inserted PT-RS samples.

31. The computer-readable medium of claim 30, further comprising code to:
perform Discrete Fourier Transform (DFT) on the plurality of samples after inserting the PT-RS samples into the plurality of samples.

32. The computer-readable medium of claim 30, further comprising code to:
identify an estimate of a delay spread of a channel.

33. A method of wireless communication at a receiving device, comprising:
determining at least one location for a phase tracking reference signal (PT-RS) samples in a received transmission comprising a sequence of a plurality of samples, wherein a first set of the plurality of samples comprises at least one of a first number of samples at a beginning of the sequence and a second number of samples at an end of the sequence that do not include the PT-RS samples, and wherein the at least one location for the PT-RS samples is within a second set of the plurality of samples that include the PT-RS samples;
extracting the PT-RS samples from the received transmission based on the at least one location; and
estimating phase errors for data samples in the received transmission based on the extracted PT-RS samples.

34. The method of claim 33, further comprising:
performing Inverse Discrete Fourier Transform (IDFT) on the received transmission before extracting the PT-RS signals, wherein the IDFT imposes a circulant structure on output samples.

35. The method of claim 33, further comprising:
correcting phases of the data samples based on the estimated phase errors.

36. The method of claim 33, wherein the phase errors for the data samples are estimated based on a circulant structure of a phase error sequence.

37. The method of claim 33, wherein the estimating the phase errors comprises performing a first estimation for the first set of the plurality of samples and performing a second estimation for the second set of the plurality of samples.

38. The method of claim 33, wherein the first set of the plurality of samples are subject to a receiver side edge effect.

39. The method of claim 38, wherein the first number of samples at the beginning of the sequence and the second number of samples at the end of the sequence are identified based on a predefined formula.

40. The method of claim 33, wherein the at least one location for the PT-RS samples is determined based on a predefined formula.

41. The method of claim 33, wherein the at least one location of the PT-RS samples does not include the first set of the plurality of samples that are subject to a receiver side window effect.

42. The method of claim 33, wherein the second set of the plurality of samples comprises samples that are less likely to be subject to a receiver side window effect.

43. The method of claim 33, further comprising:
identifying an estimate of a delay spread of a channel.

44. The method of claim 43, wherein the estimate of the delay spread comprises a length of a cyclic prefix (CP).

45. The method of claim 43, wherein the first set of the plurality of samples comprises at least one of the first number of samples at a beginning of a pre-DFT sample sequence for a symbol and the second number of samples at an end of the pre-DFT sample sequence for the symbol, wherein the first number of samples and the second number of samples are based on the estimate of the delay spread of the channel.

46. The method of claim 45, wherein at least one of the first number of samples and the second number of samples are based on at least one of the estimate of the delay spread of the channel, a Fast Fourier Transform (FFT) size, and a Discrete Fourier Transform (DFT) size of a Discrete Fourier Transform spread Orthogonal Frequency-Division Multiplexing (DFT-s-OFDM).

47. The method of claim 45, wherein at least one of the first number of samples and the second number of samples are proportional to S*J/L, where S corresponds to the estimate of the delay spread of the channel, J corresponds to a Fast Fourier Transform (FFT) size, and L corresponds to a Discrete Fourier Transform (DFT) size of a Discrete Fourier Transform spread Orthogonal Frequency-Division Multiplexing (DFT-s-OFDM).

48. The method of claim 33, wherein the first set of the plurality of samples are based on a third set of samples in a symbol that a second wireless device uses for a Fast Fourier Transform (FFT) operation.

49. The method of claim 48, wherein the third set of samples in the symbol that the second wireless device uses for the FFT operation are based on at least one of a predefined method, a length of a cyclic prefix in a transmission, and an indication from a second device.

50. The method of claim 48, where the third set of samples that the second wireless device uses for the FFT operation correspond to a cyclic shift of a subset of the plurality of samples in the symbol.

51. The method of claim 33, wherein the first set of the plurality of samples includes at least one of a first boundary sample at a beginning of a pre-DFT sample sequence for a symbol and a second boundary sample at an end of the pre-DFT sample sequence for the symbol,
wherein a third set of samples extending from the beginning of the pre-DFT sample sequence for the symbol to the first boundary sample are affected by a receiver side window effect, or
wherein a fourth set of samples extending from the second boundary sample to the end of the pre-DFT sample sequence for the symbol are affected by the receiver side window effect, and wherein the at least one location does not include at least one of the first boundary sample, the second boundary sample, the third set of samples, or the fourth set of samples.

52. The method of claim 51, wherein the at least one location includes at least one sample between the first boundary sample and the second boundary sample.

53. The method of claim 33, wherein the first number of samples at the beginning of a symbol and the second number of samples at the end of the symbol are identified based on a spacing of a user equipment transmitting the received transmission.

54. The method of claim 33, wherein the first number of samples at the beginning of a symbol and the second number of samples at the end of the symbol are identified independent of a scheduled bandwidth or a Discrete Fourier Transform size used by a user equipment in the received transmission.

55. The method of claim 33, where the at least one location is based on a set of samples in a symbol that the receiving device uses for a Fast Fourier Transform operation.

56. An apparatus for wireless communication at a transmitting device, comprising:
a memory; and
at least one processor coupled to the memory and configured to:
determine at least one location for a phase tracking reference signal (PT-RS) samples in a received transmission comprising a sequence of a plurality of samples, wherein a first set of the plurality of samples comprises at least one of a first number of samples at a beginning of the sequence and a second number of samples at an end of the sequence that do not include the PT-RS samples, and wherein the at least one location for the PT-RS samples is within a second set of the plurality of samples that include the PT-RS samples;
extract the PT-RS samples from the received transmission based on the at least one location; and
estimate phase errors for data samples in the received transmission based on the extracted PT-RS samples.

57. The apparatus of claim 56, wherein the at least one processor is further configured to:
perform Inverse Discrete Fourier Transform (IDFT) on the received transmission before extracting the PT-RS signals, wherein the IDFT imposes a circulant structure on output samples.

58. The apparatus of claim 56, wherein the at least one processor is further configured to:
correct phases of the data samples based on the estimated phase errors.

59. The apparatus of claim 56, wherein the phase errors for the data samples are estimated based on a circulant structure of a phase error sequence.

60. The apparatus of claim 56, wherein the estimating the phase errors comprises performing a first estimation for the first set of the plurality of samples and performing a second estimation for the second set of the plurality of samples.

61. The apparatus of claim 56, wherein the at least one location of the PT-RS samples does not include the first set of the plurality of samples that are subject to a receiver side window effect.

62. The apparatus of claim 56, wherein the at least one processor is further configured to:
identify an estimate of a delay spread of a channel.

63. The apparatus of claim 62, wherein the first set of the plurality of samples comprises at least one of the first number of samples at a beginning of a pre-DFT sample sequence for a symbol and the second number of samples at an end of the pre-DFT sample sequence for the symbol, wherein the first number of samples and the second number of samples are based on the estimate of the delay spread of the channel.

64. An apparatus for wireless communication at a transmitting device, comprising:
means for determining at least one location for a phase tracking reference signal (PT-RS) samples in a received transmission comprising a sequence of a plurality of samples, wherein a first set of the plurality of samples comprises at least one of a first number of samples at a beginning of the sequence and a second number of samples at an end of the sequence that do not include the PT-RS samples, and wherein the at least one location for the PT-RS samples is within a second set of the plurality of samples that include the PT-RS samples;
means for extracting the PT-RS samples from the received transmission based on the at least one location; and
means for estimating phase errors for data samples in the received transmission based on the extracted PT-RS samples.

65. The apparatus of claim 64, further comprising:
means for performing Inverse Discrete Fourier Transform (IDFT) on the received transmission before extracting the PT-RS signals, wherein the IDFT imposes a circulant structure on output samples.

66. The apparatus of claim 64, further comprising:
means for correcting phases of the data samples based on the estimated phase errors.

67. The apparatus of claim 64, further comprising:
means for identifying an estimate of a delay spread of a channel.

68. A computer-readable medium storing computer executable code for wireless communication at a receiving device, comprising code to:
determine at least one location for a phase tracking reference signal (PT-RS) samples in a received transmission comprising a sequence of a plurality of samples, wherein a first set of the plurality of samples comprises at least one of a first number of samples at a beginning of the sequence and a second number of samples at an end of the sequence that do not include the PT-RS samples, and wherein the at least one location for the PT-RS samples is within a second set of the plurality of samples that include the PT-RS samples;
extract the PT-RS samples from the received transmission based on the at least one location; and
estimate phase errors for data samples in the received transmission based on the extracted PT-RS samples.

69. The computer-readable medium of claim 68, further comprising code to:
perform Inverse Discrete Fourier Transform (IDFT) on the received transmission before extracting the PT-RS signals, wherein the IDFT imposes a circulant structure on output samples.

70. The computer-readable medium of claim 68, further comprising code to:
correct phases of the data samples based on the estimated phase errors.

71. The computer-readable medium of claim 68, further comprising code to:
  identify an estimate of a delay spread of a channel.

* * * * *